United States Patent
Xu et al.

(10) Patent No.: US 9,639,915 B2
(45) Date of Patent: May 2, 2017

(54) IMAGE PROCESSING METHOD AND APPARATUS

(71) Applicant: Samsung Electronics Co., Ltd., Suwon-si (KR)

(72) Inventors: Kuanhong Xu, Beijing (CN); Qiang Wang, Beijing (CN); Ji-yeun Kim, Seoul (KR); Woo-young Jang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 417 days.

(21) Appl. No.: 13/961,973

(22) Filed: Aug. 8, 2013

(65) Prior Publication Data

US 2014/0044375 A1 Feb. 13, 2014

(30) Foreign Application Priority Data

Aug. 8, 2012 (CN) .......................... 2012 1 0280809
Aug. 5, 2013 (KR) ........................ 10-2013-0092599

(51) Int. Cl.
    *G06T 5/00* (2006.01)
(52) U.S. Cl.
    CPC ............... *G06T 5/00* (2013.01); *G06T 5/002* (2013.01); *G06T 2207/10101* (2013.01); *G06T 2207/20012* (2013.01)
(58) Field of Classification Search
    None
    See application file for complete search history.

(56) References Cited

U.S. PATENT DOCUMENTS

| 6,763,129 | B1* | 7/2004 | Honda | G06K 9/40 |
| | | | | 382/132 |
| 7,061,651 | B2* | 6/2006 | Ogino | G06T 5/20 |
| | | | | 358/2.1 |
| 7,355,716 | B2 | 4/2008 | De Boer et al. | |
| 7,567,349 | B2 | 7/2009 | Tearney et al. | |
| 7,812,961 | B2 | 10/2010 | Yamaguchi | |
| 8,411,991 | B2* | 4/2013 | Jo | G06T 5/002 |
| | | | | 345/611 |
| 8,565,546 | B2* | 10/2013 | Coupe | G06T 5/002 |
| | | | | 382/205 |
| 9,424,632 | B2* | 8/2016 | Patil | G06T 5/50 |
| 9,462,163 | B2* | 10/2016 | Jain | G06T 5/002 |
| 2005/0140829 | A1* | 6/2005 | Uchida | H04N 5/142 |
| | | | | 348/625 |

(Continued)

OTHER PUBLICATIONS

Steele RM, Jaynes C. Overconstrained linear estimation of radial distortion and multi-view geometry. InComputer Vision—ECCV 2006 May 7, 2006 (pp. 253-264). Springer Berlin Heidelberg.*

(Continued)

*Primary Examiner* — Michelle Hausmann
(74) *Attorney, Agent, or Firm* — NSIP Law (57) ABSTRACT

An image processing method includes configuring a noise reduction filter for each of pixels in an image in accordance with a linear noise model of the image, based on different levels of a noise effect caused to a corresponding pixel, among the pixels, by other pixels, among the pixels and adjacent to the corresponding pixel. The method further includes performing noise reduction filtering on each of the pixels, using the noise reduction filter for each of the pixels, to obtain a noise reduced image.

18 Claims, 5 Drawing Sheets

(56) References Cited

U.S. PATENT DOCUMENTS

| | | | |
|---|---|---|---|
| 2006/0100527 A1* | 5/2006 | Gregori | G06T 5/002 600/476 |
| 2006/0120583 A1* | 6/2006 | Dewaele | G06T 3/0068 382/128 |
| 2007/0009170 A1* | 1/2007 | Lin | G06T 5/50 382/260 |
| 2007/0296871 A1* | 12/2007 | Yoo | G06T 5/20 348/701 |
| 2008/0012968 A1* | 1/2008 | Lim | G06T 7/0083 348/252 |
| 2008/0056607 A1* | 3/2008 | Ovsiannikov | G06T 5/002 382/275 |
| 2008/0260282 A1* | 10/2008 | Hasegawa | G06T 5/009 382/260 |
| 2008/0304758 A1* | 12/2008 | Kobayashi | H04N 19/44 382/232 |
| 2009/0066726 A1* | 3/2009 | Kato | B60R 1/00 345/639 |
| 2010/0026904 A1* | 2/2010 | Higuchi | H04N 5/145 348/700 |
| 2010/0061601 A1* | 3/2010 | Abramoff | G06K 9/00617 382/117 |
| 2010/0165206 A1* | 7/2010 | Nestares | G06T 5/50 348/607 |
| 2010/0166282 A1 | 7/2010 | Hirota | |
| 2010/0310190 A1* | 12/2010 | Lin | H04N 5/35509 382/260 |
| 2011/0135217 A1* | 6/2011 | Su | G06T 5/004 382/261 |
| 2011/0169978 A1 | 7/2011 | Lasser et al. | |
| 2012/0154629 A1* | 6/2012 | Horiuchi | H04N 7/0127 348/226.1 |
| 2013/0202177 A1* | 8/2013 | Bar-Aviv | G06T 5/008 382/131 |
| 2015/0296193 A1* | 10/2015 | Cote | H04N 9/646 382/167 |

OTHER PUBLICATIONS

Balocco, Simone, et al. "SRBF: speckle reducing bilateral filtering." (31 pages, in English).

Ozcan, Aydogan, et al. "Speckle reduction in optical coherence tomography images using digital filtering." JOSA A 24.7 (2007): 1901-1910 (18 pages, in English).

Wong, Alexander, et al. "General Bayesian estimation for speckle noise reduction in optical coherence tomography retinal imagery." Opt. Express 18.8 (2010): 8338-8352.

* cited by examiner

IMAGE PROCESSING METHOD AND APPARATUS

CROSS-REFERENCE TO RELATED APPLICATIONS

This application claims the benefit under 35 USC 119(a) of Chinese Patent Application No. 201210280809.5, filed on Aug. 8, 2012, in the Chinese Patent Office, and Korean Patent Application No. 10-2013-0092599, filed on Aug. 5, 2013, in the Korean Intellectual Property Office, the entire disclosures of which are incorporated herein by reference for all purposes.

BACKGROUND

1. Field

The following description relates to image processing methods and apparatuses.

2. Description of the Related Art

User demand for high-quality images is increasing. Accordingly, image processing technologies have been continuously developed. In addition, a variety of image processing methods for improving the quality of images have been introduced. Such image processing methods focus on how to improve processing speeds while effectively removing noises from images.

An optical coherence tomography (OCT) is a method of capturing an organization structure within a human body, using a micrometer-resolution. This technology has been widely used in ophthalmic clinics, but has the following problems when used for high-density tissues in dermatologic clinics. Due to a relatively high level of optical attenuation and several occurrences of scattering, a relatively large amount of noise may be generated. This noise may reduce a dynamic range and a signal-to-noise ratio (SNR) of an OCT system. In addition, this noise may make it difficult to distinguish details of an OCT image obtained from a high-density tissue. In this situation, there is a need for image processing methods capable of effectively reducing noises from OCT images. Moreover, in order to provide more human tissue information, there is a need for image processing methods capable of improving the quality of OCT images.

Two types of noise may be included in an OCT image. The noise may include an incoherent noise and a speckle noise. In a general pretreatment method, an incoherent noise may be suppressed through system optimization. However, a speckle noise includes tissue information. In order to remove a speckle noise, separate hardware and scanning are used. Thus, an edge of an image may be blurred, or a shooting speed may be decreased. Therefore, in order to eliminate influence of a speckle noise, the use of several posttreatment methods (for example, the use of a large quantity of digital filters) may prevent a decrease in a shooting speed and reduce phenomenon that an edge of an image is blurred during image pretreatment.

Examples of filters used in the posttreatment may include a linear filter, a nonlinear filter, a diffusion filter, and a wavelet filter. The linear filter and the wavelet filter are used on the assumption that a speckle noise model has a multiplicative form. Therefore, influence of an incoherent noise may be usually negligible, and an incoherent noise may be set to zero. However, the nonlinear filter and the diffusion filter suppress noise based on a local image feature.

The four types of the filter may suppress noise, but existing filters have the following limitations. First, in view of a noise reduction effect and a processing speed in a filter, a noise removal filter having an excellent effect may not be unsuitable for real-time image processing. Second, in a physical model using such a filter, an inherent noise is assumed as zero, and influence of an inherent noise is not considered. Third, when a noise reduction process of such a filter is used, an image may be blurred by a predetermined level, and a detailed expression of an image may be affected.

SUMMARY

In one general aspect, an image processing method includes configuring a noise reduction filter for each of pixels in an image in accordance with a linear noise model of the image, based on different levels of a noise effect caused to a corresponding pixel, among the pixels, by other pixels, among the pixels and adjacent to the corresponding pixel. The method further includes performing noise reduction filtering on each of the pixels, using the noise reduction filter for each of the pixels, to obtain a noise reduced image.

In another general aspect, an image processing apparatus includes a filter configurer configured to configure a noise reduction filter for each of pixels in an image in accordance with a linear noise model of the image, based on different levels of a noise effect caused to a corresponding pixel, among the pixels, by other pixels, among the pixels and adjacent to the corresponding pixel. The apparatus further includes a noise reduction processor configured to perform noise reduction filtering on each of the pixels, using the noise reduction filter for each of the pixels, to obtain a noise reduced image.

In still another general aspect, an apparatus includes a filter configurer configured to configure a filter for a pixel in an image based on coefficients corresponding to noise caused to the pixel by pixels adjacent to the pixel. The apparatus further includes a processor configured to filter the pixel, using the filter.

Other features and aspects will be apparent from the following detailed description, the drawings, and the claims.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
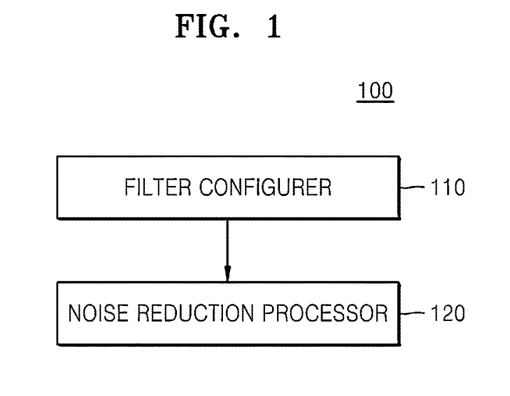
FIG. 1 is a block diagram illustrating an example of an image processing apparatus.

FIG. 1 is a block diagram illustrating an example of an image processing apparatus 100. As illustrated in FIG. 1, the image processing apparatus 100 includes a filter configurer 110 and a noise reduction processor 120.

Referring to FIG. 1, the filter configurer 110 configures a noise reduction filter in each pixel in an image in accordance with a linear noise model of the image, based on different levels of a noise effect caused to each pixel by pixel intensities of pixels spaced apart from each pixel by different distances within the image. As a pixel is closer to each pixel, a noise effect caused to each pixel by a pixel intensity of the corresponding pixel may be low. In addition, as a pixel is farther away from each pixel, a noise effect caused to each pixel by a pixel intensity of the corresponding pixel may be high.

The noise reduction processor 120 performs noise reduction filtering on each pixel, using the noise reduction filter configured in each pixel. In this manner, a noise reduced image may be obtained.

The filter configurer 110 configures a noise reduction filter in each pixel within an image as follows. First, a noise magnitude of a particular pixel is associated with a pixel intensity of the particular pixel, and is also associated with a pixel intensity of a pixel within a peripheral region. Second, regarding a noise effect caused by the particular pixel, as a pixel adjacent to the particular pixel is closer to the particular pixel, a noise effect caused to the particular pixel by a pixel intensity of the adjacent pixel increases. On the other hand, as a pixel adjacent to the particular pixel is farther away from the particular pixel, a noise effect caused to the particular pixel by a pixel intensity of the adjacent pixel decreases Therefore, the filter configurer 110 configures the noise reduction filter in each pixel, based on a pixel intensity of each adjacent pixel within the image, and an interval from each pixel. In this manner, a noise effect caused by each adjacent pixel within the image, for example, a speckle noise, may be removed more effectively and more appropriately. Hereinafter, a method of configuring the noise reduction filter in each pixel within the image will be described in detail.

A speckle noise belongs to a multiplicative random noise, and an incoherent noise belongs to an additive random noise. Therefore, when assuming that $f_i$ represents an ideal pixel intensity of a pixel i within an image, and $g_i$ represents an actual pixel intensity of the pixel i within the image, $f_i$ and $g_i$ may include a relationship based on a linear noise model of the image, as shown in the following example of Equation 1:

$$g_i = f_i u_i + n_i \quad (1)$$

In Equation 1, $u_i$ is a speckle noise within the pixel i, and $n_i$ is an incoherent noise and an additive static Gaussian noise within the pixel i.

Referring to Equation 1, an image filtering process may be considered as a process of extracting an ideal pixel intensity, for example, an ideal pixel intensity $f_i$ of the pixel i, which includes no noise at an actual pixel intensity, for example, an actual pixel intensity $g_i$ of the pixel i, with respect to each pixel within the image.

The ideal pixel intensity $f_i$ of the pixel i may be obtained based on Equation 1 above, as shown in the following example of Equation 2:

$$f_i = a_i g_i + b_i \quad (2)$$

In Equation 2, $a_i = 1/u_i$ and $b_i = -n_i/u_i$.

In this manner, the noise reduction filter may be configured with respect to the pixel i, based on Equation 2 above. In other words, since the function $f_i$ of the noise reduction filter configured with respect to the pixel i satisfies Equation 2, the noise reduction filter outputs the ideal pixel intensity $f_i$ of the pixel i when the actual pixel intensity $g_i$ of the pixel i is input through the corresponding noise reduction filter. In addition, $a_i$ and $b_i$ may be considered as a first noise coefficient and a second noise coefficient of the filter function $f_i$ configured with respect to the pixel i, respectively. Therefore, since $g_i$ may be directly obtained from the image, the process of configuring the noise reduction filter with respect to the pixel i within the image may be a process of actually determining the coefficients $a_i$ and $b_i$ of the filter $f_i$ configured in the pixel i.

The related art has already proven that a noise level of a speckle noise is generally in proportion to a local grayscale. In other words, a relatively bright region may be more easily influenced by a speckle noise than a relatively dark region. This feature of the speckle noise may complicate an image processing method.

However, a speckle intensity noise may be obtained from a local intensity of a noise-containing image. Therefore, a noise reduction filter may be configured in a pixel on a basis of a region including a predetermined size. In other words, the noise reduction filter may be configured in the pixel i, considering a noise effect caused to the pixel i by other pixels within the region including the predetermined size around the pixel i.

It is assumed that $\omega_i$ is a pixel set including all pixels within the region including the predetermined size around the pixel i, for example, a square region including a predetermined size around the pixel i. The noise coefficients $a_i$ and $b_i$ of the noise reduction filter $f_i$ configured in the pixel i may be determined, based on actual pixel intensities of all pixels within the pixel set $\omega_i$.

For example, $a_i$ and $b_i$ when $E(a_i, b_i)$ of the following example of Equation 3 is minimum within the pixel set $\omega_i$ region may be determined as the noise coefficients $a_i$ and $b_i$ of the noise reduction filter $f_i$ of the pixel i:

$$E(a_i, b_i) = \Sigma((a_i g_i + b_i - g_i)^2 + \epsilon a_i^2) \quad (3)$$

In Equation 3, $\epsilon$ is a normalized variable that is predefined so as to prevent $a_i$ from excessively increasing. $a_i$ and $b_i$ when $E(a_i, b_i)$ of Equation 3 is minimum may be calculated through linear regression, as shown in the following examples of Equations 4 and 5:

$$a_i = \frac{\frac{1}{|\omega_i|} \sum_{k \in \omega_i} g_k^2 - \bar{g}_{\omega_i}^2}{\sigma_{g_{\omega_i}}^2 + \varepsilon} \quad (4)$$

$$b_i = \bar{g}_{\omega_i}(1 - a_i) \quad (5)$$

Referring to Equations 4 and 5, $|\omega_i|$ represents a number of pixels included in the pixel set $\omega_i$. $\overline{g_{\omega_i}}$ represents an average of actual pixel intensities of all pixels included in the pixel set $\omega_i$. $g_k$ represents an actual pixel intensity of a pixel k included in the pixel set $\omega_i$, which is directly obtained from the image. $\sigma_{g_{\omega_i}}^2$ represents a dispersion of actual pixel intensities of all pixels included in the pixel set $\omega_i$. Referring to Equations 4 and 5, the coefficients $a_i$ and $b_i$ may reflect the noise effect that is caused to the pixel i by the pixels within the predetermined range around the pixel i (in other words, the pixels within the pixel set $\omega_i$)

Referring to Equations 4 and 5, all pixels within the pixel set $\omega_i$ include the same weighted value in the coefficients $a_i$ and $b_i$. However, in the pixel set $\omega_i$, as a pixel is closer to the pixel i, a noise effect caused to the pixel i by the pixel intensity of the corresponding pixel may increase. In addition, as a pixel is farther away from the pixel i, a noise effect caused to the pixel i by the pixel intensity of the corresponding pixel may decrease. Therefore, a weighted value may be applied to the noise effect that is caused to the pixel i by each pixel within the pixel set $\omega_i$, such that pixels spaced apart from the pixel i by different distances cause different levels of a noise effect to the pixel i.

With respect to an arbitrary pixel j (j≠1) within the pixel set $\omega_i$, a new pixel set $\omega_j$, which is a region including a size equal to or different from a size of $\omega_i$, may be defined. In this region, noise coefficients $a_j$ and $b_j$ of the pixel j may be obtained based on Equations 4 and 5.

Through this method, the noise coefficients of each pixel within the pixel set $\omega_i$ may be obtained. Next, a first weighted noise coefficient $\overline{a_i}$ and a second weighted noise coefficient $\overline{b_i}$ of the noise reduction filter $f_i$ configured with respect to the pixel i may be obtained by applying weighted values to the noise coefficients obtained with respect to each pixel within the pixel set $\omega_i$.

The first weighted noise coefficient $\overline{a_i}$ may be calculated using the following example of Equation 6:

$$\begin{cases} \overline{a_i} = \dfrac{1}{|\omega_i|}\sum_{j\in\omega_i} \beta_j a_j \\ a_j = \dfrac{\dfrac{1}{|\omega_i|}\sum_{k\in\omega_j} g_k^2 - \overline{g}_{\omega_j}^2}{\sigma_{g_{\omega_j}}^2 + \varepsilon} \end{cases} \quad (6)$$

The second weighted noise coefficient $\overline{b_i}$ may be calculated using the following example of Equation 7:

$$\begin{cases} \overline{b_i} = \dfrac{1}{|\omega_i|}\sum_{j\in\omega_i} \beta_j b_j \\ b_j = \overline{g}_{\omega_j}^2 (1 - a_j) \end{cases} \quad (7)$$

In Equations 6 and 7, $\beta_j$ represents a weighted coefficient at which $a_j$ and $b_j$ contribute to $\overline{a_i}$ and $\overline{b_i}$, and may be predefined. For convenience of description, it is assumed that $\beta_j$ is equal to 1 ($\beta_j=1$). The weighted values are applied using a triangular weighting method.

Various weighting methods, including a Gaussian weighting method, may be used. Referring to Equations 6 and 7, in calculating the first weighted noise coefficient $\overline{a_i}$ and the second weighted noise coefficient $\overline{b_i}$ of the noise reduction filter $f_i$ configured in the pixel i, as a pixel is farther away from the pixel i, the obtained degree of the actual pixel intensity of the corresponding pixel may be low (in other words, the weighted value may be small). Therefore, the calculated weighted values may reflect different levels of the noise effect caused to the pixel i by the pixels spaced apart from the pixel i by different distances.

Therefore, the filter configurer 110 of the image processing apparatus 100 may configure the noise reduction filter $f_i$ with respect to the pixel i, based on the following example of Equation 8:

$$f_i = \overline{a_i} g_i + \overline{b_i} \quad (8)$$

In Equation 8, $g_i$ represents the actual pixel intensity of the pixel i, which may be directly obtained from the image, and $\overline{a_i}$ and $\overline{b_i}$ represent the first weighted noise coefficient and the second weighted noise coefficient of the pixel i, respectively, which may be obtained by calculating different levels of the noise effect caused to the pixel i by pixels within a predetermined range around the pixel i.

After the noise reduction filter is configured with respect to each pixel within the image, a noise reduced image may be obtained in such a manner that the noise reduction filter configured in each pixel within the image performs noise filtering on each pixel within a frequency domain, based on Equation 8, through the noise reduction processor 120 of the image processing apparatus 100.

However, details of the operating method of the noise reduction filter configured by the filter configurer 110 are not limited to the above-described methods, and a noise reduction filter unit may be configured through various modeling methods known in the art. For example, the operating method may be assumed based on intensity of an optical transmission model. In addition, the method of applying the weighted values to the coefficients of the configured noise reduction filters, considering different levels of the noise effect caused to the particular pixel by the pixels separated from the particular pixel within the image by different distances, is not limited to the above description. For example, the weighted values may be applied using the Gaussian weighting method.

Figure 2:
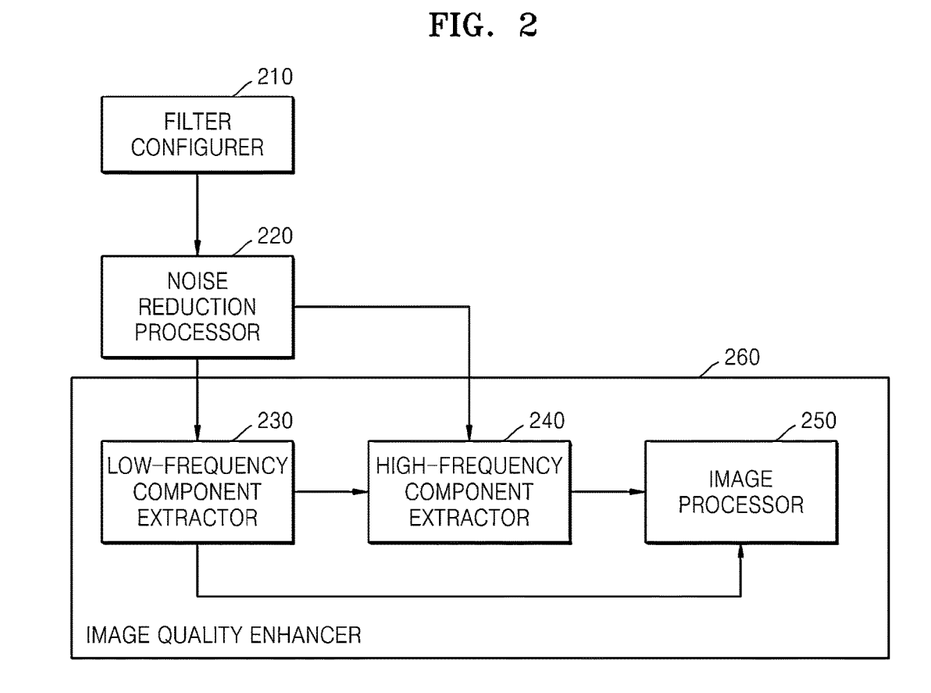
FIG. 2 is a block diagram illustrating another example of an image processing apparatus.

FIG. 2 is a block diagram illustrating another example of an image processing apparatus 200. The image processing apparatus 200 of FIG. 2 may be used to obtain an enhanced image in which a detail and a contrast are improved.

As illustrated in FIG. 2, the image processing apparatus 200 includes a filter configurer 210, a noise reduction processor 220, and an image quality enhancer 260. Since the filter configurer 210 and the noise reduction processor 220 of the image processing apparatus 200 of FIG. 2 may correspond to the filter configurer 110 and the noise reduction processor 120 of the image processing apparatus 100 of FIG. 1, and may perform the same functions, respectively, a detailed description thereof will be omitted herein.

The image quality enhancer 260 obtains an enhanced image (in other words, an image including an improved image quality) through a high-frequency component within the improved noise reduced image. Since a detail within the image and an effect appearing in an edge of the image are associated with a high-frequency component of the image, a detail and a contrast within the noise reduced image may be improved through the high-frequency component within the noise reduced image. Therefore, a clearer input image including an improved image quality may be obtained.

Referring to FIG. 2, the image quality enhancer 260 includes a low-frequency component extractor 230, a high-frequency component extractor 240, and an image processor 250.

After the noise reduced image is obtained through the noise reduction processor 220, quality improvement processing is additionally performed on the image through the low-frequency component extractor 230, the high-frequency component extractor 240, and the image processor 250 of the image quality enhancer 260. In this manner, an enhanced image including an improved image quality (for example, an image including improved detail and contrast) may be obtained. Compared with the image processing apparatus 100 illustrated in FIG. 1, the image processing apparatus 200 illustrated in FIG. 2 may further include the image quality enhancer 260 used to improve the image quality.

For example, the low-frequency component extractor 230 extracts a low-frequency component $p_{low}$ of the noise reduced image p, in a frequency domain, in such a manner that the noise reduction filter configured in each pixel by the filter configurer 210 additionally filters each pixel within the noise reduced image p.

The high-frequency component extractor 240 extracts a high-frequency component $p_{high}$ of the noise reduced image p, based on the noise reduced image p and the extracted low-frequency component $p_{low}$ of the noise reduced image p.

The high-frequency component $p_{high}$ of the noise reduced image p may be extracted using the following example of Equation 9:

$$p_{high} = p - p_{low} \quad (9)$$

In Equation 9, p represents the noise reduced image of the frequency domain, which is obtained through the noise reduction processor 220, and $p_{low}$ represents the low-frequency component of the noise reduced image p, which is obtained through the low-frequency component extractor 230.

After the low-frequency component $p_{low}$ and the high-frequency component $p_{high}$ of the noise reduced image p are extracted through the low-frequency component extractor 230 and the high-frequency component extractor 240, a weighted value of the high-frequency component $p_{high}$ may be increased by linearly combining the high-frequency component $p_{high}$ and the low-frequency component $p_{low}$ through the image processor 250. Therefore, the enhanced image $p_{enhanced}$ including an improved image quality may be obtained.

The low-frequency component $p_{low}$ extracted through the low-frequency component extractor 230 and the high-frequency component $p_{high}$ extracted through the high-frequency component extractor 240 are linearly combined to provide the enhanced image $p_{enhanced}$, as shown in the following example of Equation 10:

$$p_{enhanced} = \lambda p_{high} + p_{low} \quad (10)$$

In Equation 10, λ is a predefined weighted value, and may be predefined through an experiment.

The detail and contrast of the noise reduced image may be improved through the weighted value of the high-frequency component within the improved noise reduced image. Therefore, λ may be defined to be greater than 1.

By using the image processing method, the quality of images may be effectively improved. However, the method of obtaining the enhanced image including the improved image quality by improving the high-frequency component within the noise reduced image is not limited to the above description. The image quality enhancer 260 may improve the image quality of the input image by various image quality improving methods known in the art.

Hereinafter, results obtained when an OCT image is processed using the image processing apparatuses 100 and 200, and results obtained when an OCT image is processed using filters according to the related art, are compared with each other.

Figure 3A:
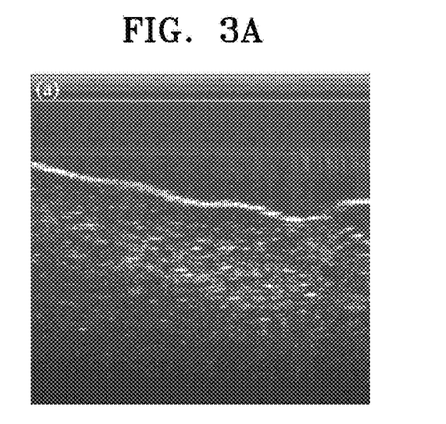
FIGS. 3A to 3C are diagrams illustrating examples of image processing results obtained after an initial input image is processed using image processing apparatuses.
Figure 3B:
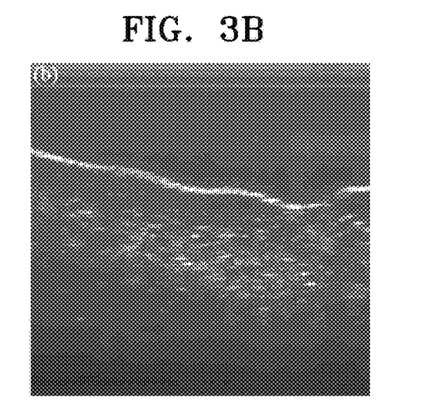
Figure 3C:
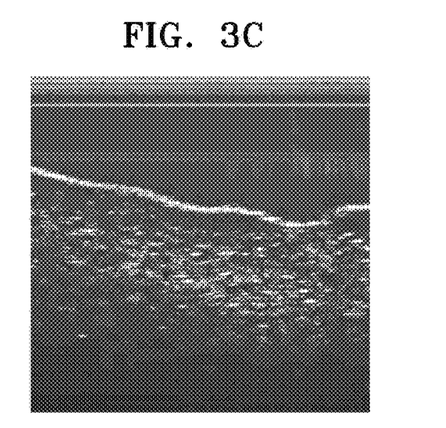

FIGS. 3A to 3C are diagram illustrating examples of image processing results obtained after an initial input image is processed using the image processing apparatuses 100 and 200. FIG. 3A illustrates an initial input OCT image. FIG. 3B illustrates a noise reduced image obtained by processing the initial input OCT image through the image processing apparatus 100 illustrated in FIG. 1. FIG. 3C illustrates an enhanced image obtained by processing the noise reduced image through the image processing apparatus 200 illustrated in FIG. 2.

Comparing FIG. 3A with FIG. 3B, it is clearly shown that noise (including speckle noise) within the initial input OCT image is effectively removed in the noise reduced image. However, compared with the initial input OCT image illustrated in FIG. 3A, an image edge and an image detail of the noise reduced image may be slightly blurred during noise processing. This may be a general limitation of a digital filtering method.

Compared with the above description, as illustrated in FIG. 3C, when an image quality of the noise reduced image is additionally improved using the image processing apparatus 200 of FIG. 2, the enhanced image including improved detail and contrast may be obtained.

The image quality may be evaluated through four numerical values, that is, a peak signal-to-noise ratio (PSNR), a signal-to-noise ratio (SNR), a structural similarity (SSIM), and a single image signal-to-noise ratio (SNRs). Table 1 below shows each numerical value estimated with respect to the initial input OCT image, the noise reduced image, and the enhanced image.

TABLE 1

|  | Initial Input Image | Noise Reduced Image | Enhanced Image |
| --- | --- | --- | --- |
| SNRs (dB) | 33.2 | 48.6 | 43.2 |
| PSNR (dB) | N/A | 28.8 | 31.8 |
| SNR (dB) | N/A | 17.3 | 20.5 |
| SSIM | N/A | 0.77 | 0.90 |

Comparing SNRs values of the noise reduced image and the enhanced image with an SNRs value of the initial input OCT image, it is shown that the noise is effectively removed after the noise filtering and the image quality improvement processing. Although the noise within the enhanced image obtained after the image quality improvement processing is increased and the SNRs is decreased, as compared with the noise reduced image, the other numerical values, that is, PSNR, SNR, and SSIM, are more improved. This may mean that the image quality improvement process used by the image processing apparatus 200 is capable of effectively restoring the image detail that is lost in the process of reducing the noise of the initial input OCT image.

In addition, the coefficient SSIM, which is used to estimate a sharpness of edge and to which a visual feature of human eyes is more reflected, is improved to 0.9 in the enhanced image. This may mean that if the image quality improvement processing may be performed, much more image detail and edge portion are preserved, and the visibility of the enhanced image may be improved.

Figure 4A:
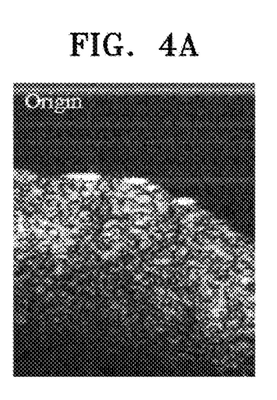
FIGS. 4A to 4K are diagrams illustrating a comparison between examples of image processing results obtained using image processing apparatuses, and image processing results obtained using filters according to the related art.
Figure 4B:
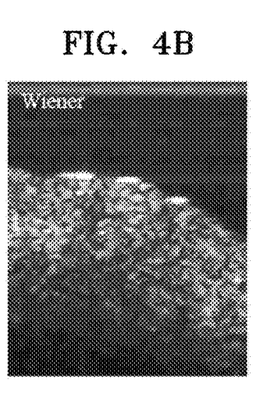
Figure 4C:
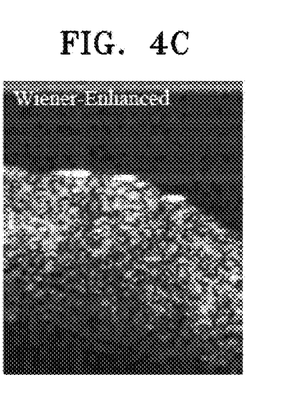
Figure 4D:
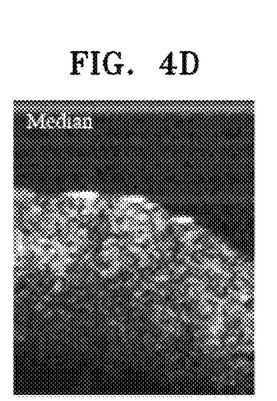
Figure 4E:
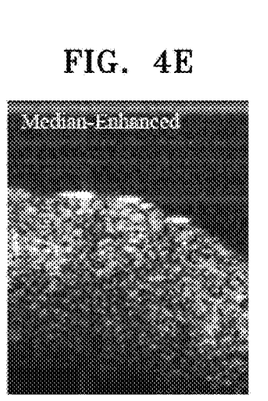
Figure 4F:
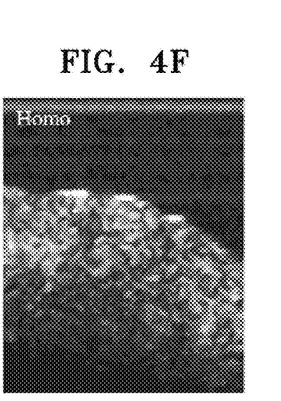
Figure 4G:
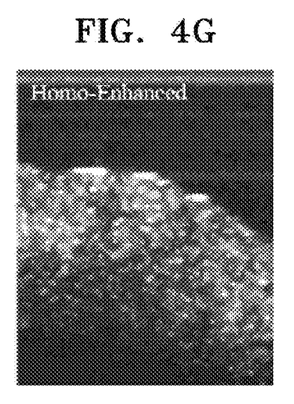
Figure 4H:
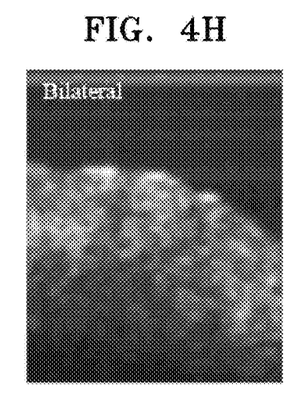
Figure 4I:
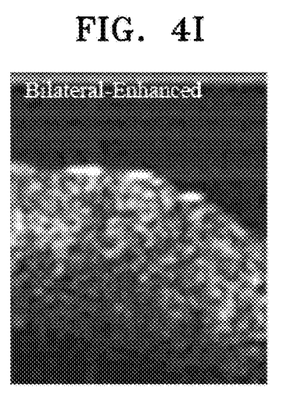
Figure 4J:
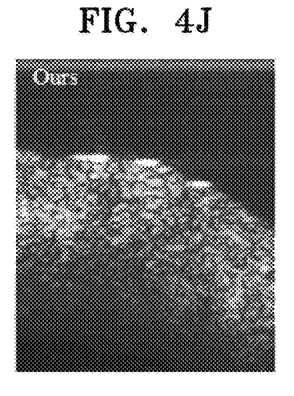
Figure 4K:
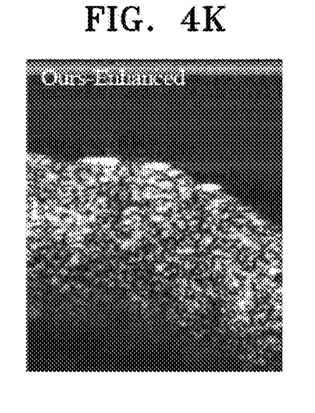

FIGS. 4A to 4K are diagrams illustrating a comparison between examples of image processing results obtained using the image processing apparatuses 100 and 200, and image processing results obtained using filters according to the related art. FIG. 4A illustrates an initial input OCT image. FIGS. 4B and 4C illustrate a noise reduced image and an enhanced image obtained by processing the image through the Wiener filter. FIGS. 4D and 4E illustrate a noise reduced image and an enhanced image obtained by processing the image through a median filter. FIGS. 4F and 4G illustrate a noise reduced image and an enhanced image obtained by processing the image through a homomorphic filter. FIGS. 4H and 4I illustrate a noise reduced image and an enhanced image obtained by processing the image through a bilateral filter. FIGS. 4J and 4K illustrate a noise reduced image and an enhanced image obtained by processing the image through the image processing apparatuses 100 and 200, respectively.

As illustrated in FIGS. 4B to 4I, noise within the image may be removed by the Wiener filter, the median filter, the homomorphic filter, and the bilateral filter, but an image detail may be slightly blurred. Comparing the images of FIGS. 4B to 4K with the initial input OCT image of FIG. 4A, image quality improvement effects of the image processing apparatuses 100 and 200 are more excellent, and more image detail may be preserved. Although the image quality of FIG. 4E is relatively better, more bright spots appear as compared with the initial input OCT image.

Table 2 below shows a comparison result of numerical values in each item, which are obtained by image processing performed using the filter according to the related art and the image processing apparatuses 100 and 200.

TABLE 2

| SNRs = 30.6 dB | Noise Reduced Image | | | | | Enhanced Image | | | | |
|---|---|---|---|---|---|---|---|---|---|---|
| | SNRs (dB) | SNR (dB) | PSNR (dB) | SSIM | Time (s) | SNRs (dB) | SNR (dB) | PSNR (dB) | SSIM | Time (s) |
| Wiener | 40.4 | 14.5 | 28.1 | 0.64 | 0.23 | 36.3 | 16.5 | 30.0 | 0.73 | 0.41 |
| Median | 35.5 | 15.6 | 29.3 | 0.79 | 6.2 | 31.3 | 16.3 | 29.6 | 0.85 | 12.3 |
| Homomorphic | 37.0 | 13.6 | 27.2 | 0.67 | 0.15 | 36.0 | 13.4 | 26.7 | 0.66 | 0.22 |
| Bilateral | 40.5 | 11.0 | 23.7 | 0.54 | 0.80 | 37.4 | 12.6 | 26.2 | 0.63 | 1.65 |
| Embodiment | 44.9 | 15.6 | 28.9 | 0.68 | 0.25 | 37.4 | 18.7 | 31.9 | 0.86 | 0.50 |

As shown in Table 2 above, when the image processing apparatuses 100 and 200, the homomorphic filter, or the Wiener filter are used in the operation of obtaining the noise reduced image by reducing the noise of the image, the processing time appears as an appropriate value, and thus, it may be considered that they are suitable for real-time processing. In addition, when the image processing apparatuses 100 and 200 are used, the maximum SNRs and SNR values are obtained.

In the image quality improving operation of obtaining the enhanced image by additionally processing the noise reduced image, the processing time is more reduced, and the best results are obtained in other numerical items in the example of using the image processing apparatuses 100 and 200, as compared with the example of using the homomorphic filter and the Wiener filter. Therefore, in the example of using the image processing apparatuses 100 and 200, the speckle noise and the incoherent noise may be more effectively removed from the image, the image detail may be maximally preserved, and the image processing speed may be highest.

Figure 5:
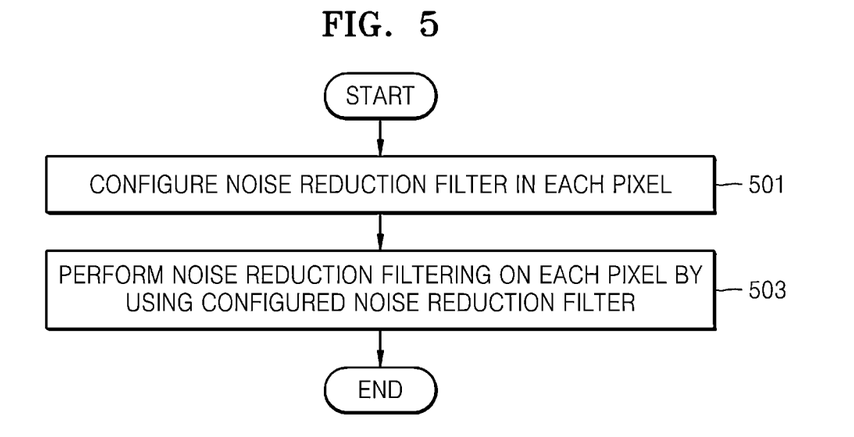
FIG. 5 is a flowchart illustrating an example of an image processing method.

FIG. 5 is a flowchart illustrating an example of an image processing method that is performed by the image processing apparatus 100. Referring to FIG. 5, in operation 501, the filter configurer 110 of the image processing apparatus 100 configures a noise reduction filter in each pixel in an image in accordance with a linear noise model of the image, based on different levels of a noise effect caused to each pixel by pixel intensities of pixels spaced apart from each pixel by difference distances within the image.

In operation 503, the noise reduction processor 120 of the image processing apparatus 100 performs noise reduction filtering on each pixel by using the noise reduction filter configured in each pixel by the filter configurer 110, to obtain a noise reduced image. Since the operation of configuring the noise reduction filter in each pixel, and the operation of performing the noise reduction filtering, have been described above, a redundant description thereof will be omitted herein.

Figure 6:
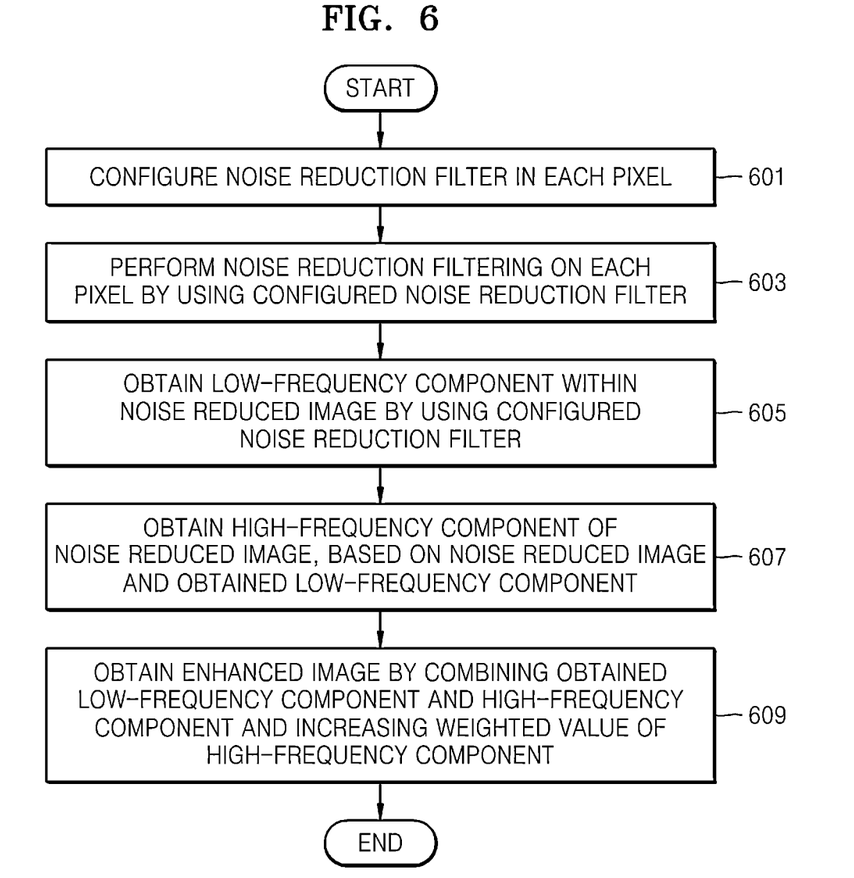
FIG. 6 is a flowchart illustrating another example of an image processing method.

FIG. 6 is a flowchart illustrating another example of an image processing method that is performed by the image processing apparatus 200. Referring to FIG. 6, in operation 601, the filter configurer 210 of the image processing apparatus 200 configures a noise reduction filter in each pixel in an image in accordance with a linear noise model of the image, based on different levels of a noise effect caused to each pixel by pixel intensities of pixels spaced apart from each pixel by difference distances within the image.

In operation 603, the noise reduction processor 120 of the image processing apparatus 100 performs noise reduction filtering on each pixel by using the noise reduction filter configured in each pixel by the filter configurer 210, to obtain a noise reduced image. Operations 601 and 603 may correspond to operations 501 and 503 of FIG. 5. Since the operation of configuring the noise reduction filter in each pixel, and the operation of performing the noise reduction filtering, have been described above, a redundant description thereof will be omitted herein.

In operations 605 to 609, the image quality enhancer 260 of the image processing apparatus 200 obtains an enhanced image including an improved image quality by improving a high-frequency component within the noise reduced image.

In more detail, in operation 605, the low-frequency component extractor 230 of the image quality enhancer 260 obtains a low-frequency component within the noise reduced image by using the noise reduction filter configured in each pixel by the filter configurer 110, to additionally filter each pixel within the noise reduced image.

In operation 607, the high-frequency component extractor 240 of the image quality enhancer 260 obtains a high-frequency component of the noise reduced image, based on the noise reduced image and the obtained low-frequency component of the noise reduced image.

In operation 609, the image processor 250 of the image quality enhancer 260 obtains an enhanced image by combining the obtained low-frequency component and high-frequency component and increasing a weighted value of the high-frequency component. Thus, the enhanced image including an improved image quality (for example, the image including improved detail and contrast) may be obtained. Since the method of improving the image quality, using the low-frequency component extractor 230, the high-frequency component extractor 240, and the image processor 250 included in the image quality enhancer 260 has been described above in detail, a redundant description thereof will be omitted herein.

The examples of an image processing apparatus and an image processing method described may more effectively remove speckle noise and incoherent noise from images. In addition, an image processing speed may be improved while maintaining an image processing effect, as compared with an existing digital filter, such as a wavelet filter, a bilateral filter, a Wiener filter, or a median filter. Furthermore, the examples of the image processing apparatus and the image processing method may process an image effectively in real time. Moreover, a higher quality of OCT images may be obtained.

The various units, elements, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may include various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions that control a processing device to implement a software component may include a computer program, a piece of code, an instruction, or some combination thereof, that independently or collectively instructs or configures the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments that implement the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An image processing method comprising, using one or more processors:

configuring a noise reduction filter for each pixel in an image based on a linear noise model of the image, wherein the linear noise model of the image is based on a predetermined distance range of pixels surrounding a target pixel and on a weighted intensity of each of the pixels surrounding the target pixel, and wherein the weighted intensity of each of the pixels surrounding the target pixel is based on a distance between each of the pixels and the target pixel; and applying the noise reduction filter on each pixel in an image to obtain a noise reduced image, wherein the noise reduction filter is proportional to multiplication of an intensity of the target pixel and a first coefficient calculated based on the pixel set comprising pixels in a region of a predetermined size around the target pixel and based on a difference of squares between an intensity of one of the pixels and an average of intensities of the pixels summed over the pixels, divided by a number of the pixels in the pixel set, and divided by a sum of a dispersion of the intensities of the pixels and a normalized variable.

2. The image processing method of claim 1, wherein a noise effect caused to the target pixel by an intensity of a first pixel, among the other pixels, which is closer to the target pixel, is lower than a noise effect caused to the target pixel by an intensity of a second pixel, among the other pixels, which is farther away from the target pixel.

3. The image processing method of claim 1, wherein the configuring comprises configuring the noise reduction filter $f_i$ for a pixel i, among the pixels, based on the following equation:

$$f_i = \overline{a}_i g_i + \overline{b}_i,$$

wherein $g_i$ is an intensity of the pixel i, and $\overline{a}_i$ and $\overline{b}_i$ are a first coefficient and a second coefficient, respectively, of the pixel i, and correspond to the different levels of the noise effect.

4. The image processing method of claim 3, wherein the configuring comprises:

calculating the first coefficient $\overline{a}_i$ based on the following equation $$\begin{cases} \overline{a}_i = \dfrac{1}{|\omega_i|} \sum_{j \in \omega_i} \beta_j a_j \\ a_j = \dfrac{\dfrac{1}{|\omega_i|} \sum_{k \in \omega_j} g_k^2 - \overline{g}_{\omega_j}^2}{\sigma_{g_{\omega_j}}^2 + \varepsilon}; \end{cases}$$

and calculating the second coefficient $\overline{b}_i$ based on the following equation $$\begin{cases} \overline{b}_i = \dfrac{1}{|\omega_i|} \sum_{j \in \omega_i} \beta_j b_j \\ b_j = \overline{g}_{\omega_j}^2 (1 - a_j), \end{cases}$$

wherein $\omega_i$ is a pixel set comprising pixels in a region of a predetermined size around the pixel i, $\omega_j$ is a pixel set comprising pixels in a region of a predetermined size around an arbitrary pixel j in the pixel set $\omega_i$, $|\omega_i|$ and $|\omega_j|$ are numbers of the pixels in the pixel sets $\omega_i$ and $\omega_j$, respectively, $g_k$ is an intensity of an arbitrary pixel k in the pixel set $\omega_j$, $\overline{g}_{\omega_j}$ is an average of intensities of the pixels in the pixel set $\omega_j$, $\sigma_{g_{\omega_j}}^2$ is a dispersion of the intensities of the pixels in the pixel set $\omega_j$, $\varepsilon$ is a predetermined normalized variable, and $\beta_j$ is a predetermined coefficient at which $a_j$ and $b_j$ contribute to $\overline{a}_i$ and $\overline{b}_i$.

5. The image processing method of claim 1, further comprising increasing a high-frequency component in the noise reduced image to obtain an enhanced image.

6. The image processing method of claim 5, wherein the increasing comprises:

filtering each of the pixels in the noise reduced image, using the noise reduction filter for each of the pixels, to extract a low frequency component of the noise reduced image;

extracting the high-frequency component of the noise reduced image, based on the noise reduced image and the extracted low-frequency component; and combining the extracted high-frequency component and the extracted low-frequency component, and increasing a weighted value of the high-frequency component, to obtain the enhanced image.

7. The image processing method of claim 6, wherein the extracting of the high-frequency component comprises extracting the high-frequency component $p_{high}$ based on the following equation:

$$p_{high} = p - p_{low},$$

wherein p is the noise reduced image, and $p_{low}$ is the extracted low-frequency component.

8. The image processing method of claim 6, wherein the combining comprises combining the extracted low-frequency component $p_{low}$ and the extracted high-frequency component $p_{high}$ to obtain the enhanced image $p_{enhanced}$ based on the following equation:

$$p_{enhanced} = \lambda p_{high} + p_{low},$$

wherein λ is a predetermined value greater than 1.

9. The image processing method of claim 1, wherein the image is an optical coherence tomography (OCT) image.

10. A non-transitory computer-readable storage medium storing a program comprising instructions to cause a computer to perform the method of claim 1.

11. An image processing apparatus comprising one or more processors comprising:
a filter configurer that configures a noise reduction filter for each pixel in an image based on a linear noise model of the image,
wherein the linear noise model of the image is based on a predetermined distance range of pixels surrounding a target pixel and on a weighted intensity of each of the pixels surrounding the target pixel, and
wherein the weighted intensity of each of the pixels surrounding the target pixel is based on a distance between each of the pixels and the target pixel; and
a noise reduction processor configured to obtain a noise reduced image by performing noise reduction filtering using the noise reduction filter for each pixel in the image,
wherein the noise reduction filter is proportional to multiplication of an intensity of the target pixel and a first coefficient calculated based on the pixel set comprising pixels in a region of a predetermined size around the target pixel and based on a difference of squares between an intensity of one of the pixels and an average of intensities of the pixels summed over the pixels, divided by a number of the pixels in the pixel set, and divided by a sum of a dispersion of the intensities of the pixels and a normalized variable.

12. The image processing apparatus of claim 11, wherein a noise effect caused to the target pixel by an intensity of a first pixel, among the other pixels, which is closer to the target pixel, is lower than a noise effect caused to the target pixel by an intensity of a second pixel, among the other pixels, which is farther away from the target pixel.

13. The image processing apparatus claim 11, wherein the filter configurer is further configured to configure the noise reduction filter $f_i$ for a pixel i, among the pixels, based on the following equation:

$$f_i = \overline{a}_i g_i + \overline{b}_i,$$

wherein $g_i$ is an intensity of the pixel i, and $\overline{a}_i$ and $\overline{b}_i$ are a first coefficient and a second coefficient, respectively, of the pixel i, and correspond to the different levels of the noise effect.

14. The image processing apparatus of claim 13, wherein the filter configurer is further configured to:
calculate the first coefficient $\overline{a}_i$ based on the following equation $$\begin{cases} \overline{a}_i = \dfrac{1}{|\omega_i|} \sum_{j \in \omega_i} \beta_j a_j \\ a_j = \dfrac{\dfrac{1}{|\omega_j|} \sum_{k \in \omega_j} g_k^2 - \overline{g}_{\omega_j}^2}{\sigma_{g_{\omega_j}}^2 + \varepsilon}; \end{cases}$$

and
calculate the second coefficient $\overline{b}_i$ based on the following equation $$\begin{cases} \overline{b}_i = \dfrac{1}{|\omega_i|} \sum_{j \in \omega_i} \beta_j b_j \\ b_j = \overline{g}_{\omega_j}^2 (1 - a_j), \end{cases}$$

wherein $\omega_i$ is a pixel set comprising pixels in a region of a predetermined size around the pixel i,
$\omega_j$ is a pixel set comprising pixels in a region of a predetermined size around an arbitrary pixel j in the pixel set $\omega_i$,
$|\omega_i|$ and $|\omega_j|$ are numbers of the pixels in the pixel sets $\omega_i$ and $\omega_j$, respectively,
$g_k$ is an intensity of an arbitrary pixel k in the pixel set $\omega_j$,
$\overline{g}_{\omega_j}$ is an average of intensities of the pixels in the pixel set $\omega_j$,
$\sigma_{g_{\omega_j}}^2$ is a dispersion of the intensities of the pixels in the pixel set $\omega_j$,
$\epsilon$ is a predetermined normalized variable, and
$\beta_j$ is a predetermined coefficient at which $a_j$ and $b_j$ contribute to $\overline{a}_i$ and $\overline{b}_i$.

15. The image processing apparatus of claim 11, further comprising an image quality enhancer configured to increase a high-frequency component in the noise reduced image to obtain an enhanced image.

16. The image processing apparatus of claim 15, wherein the image quality enhancer comprises:
a low-frequency component extractor configured to filter each of the pixels in the noise reduced image, using the noise reduction filter for each of the pixels, to extract a low frequency component of the noise reduced image;
a high-frequency component extractor configured to extract the high-frequency component of the noise reduced image, based on the noise reduced image and the extracted low-frequency component; and
an image processor configured to combine the extracted high-frequency component and the extracted low-frequency component, and increase a weighted value of the high-frequency component, to obtain the enhanced image.

17. The image processing apparatus claim 16, wherein the high-frequency component extractor is further configured to extract the high-frequency component $p_{high}$ based on the following equation:

$$p_{high} = p - p_{low},$$

wherein p is the noise reduced image, and $p_{low}$ is the extracted low-frequency component.

18. The image processing apparatus of claim 16, wherein the image processor is further configured to combine the extracted low-frequency component $p_{low}$ and the extracted high-frequency component $p_{high}$ to obtain the enhanced image $p_{enhanced}$ based on the following equation:

$$p_{enhanced} = \lambda p_{high} + p_{low},$$

wherein λ is a predetermined value greater than 1.

* * * * *